May 10, 1949.  C. O. CROW  2,469,865
HAND TOOL
Filed March 13, 1946
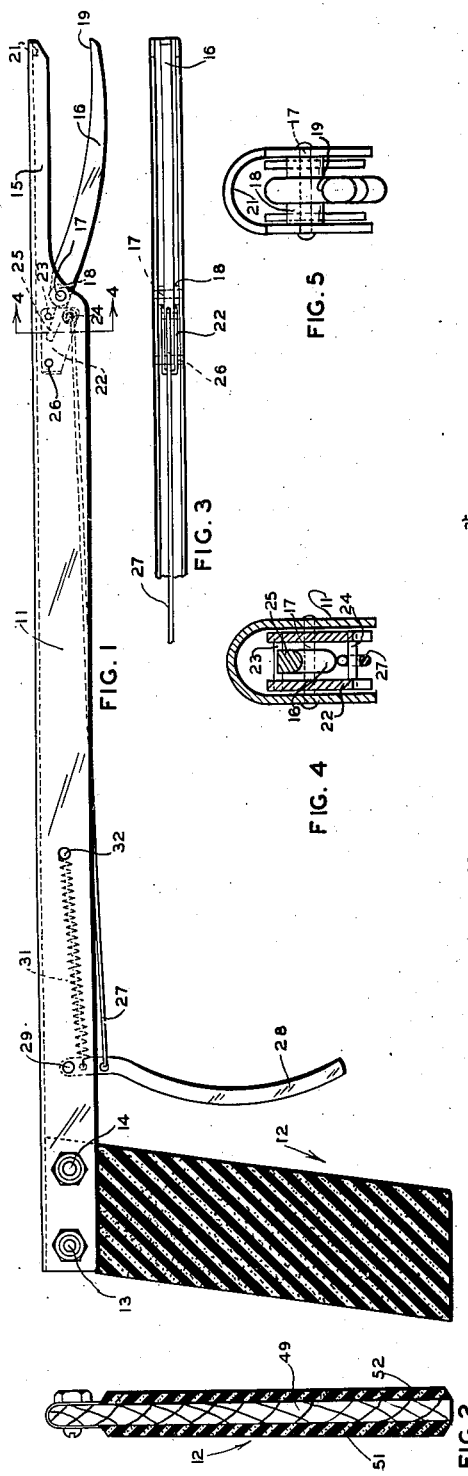
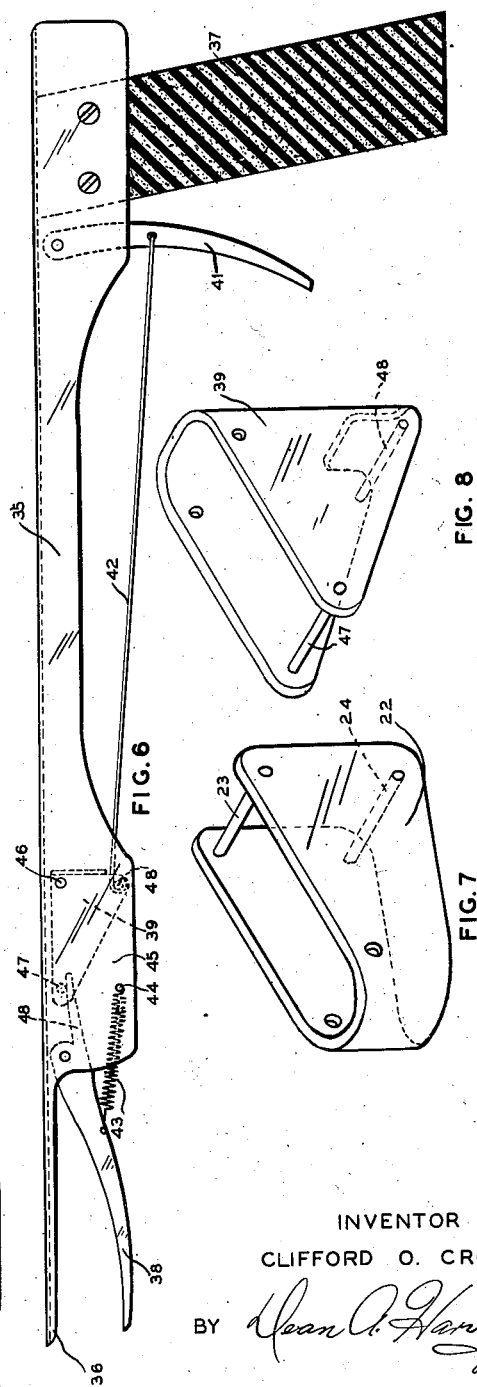
INVENTOR
CLIFFORD O. CROW
BY
ATTORNEY Patented May 10, 1949

2,469,865

UNITED STATES PATENT OFFICE 2,469,865

HAND TOOL

Clifford O. Crow, Columbia, Mo.

Application March 13, 1946, Serial No. 654,158

1 Claim. (Cl. 294—104)

This invention relates to tools, generally, and concerns itself more particularly with pliers and tongs.

It is a general aim of the invention to provide a hand tool capable of entering otherwise inaccessible places and withdrawing misplaced objects therefrom.

A more specific object is to provide a pair of long shanked tongs having a fixed jaw, formed as an extension of the shank, with which a movable jaw, operated remotely through linkages contained within the shank, cooperates to grasp and hold articles of various sizes and shapes.

Another object of the invention is the provision of a pair of long shanked tongs having a pistol grip handle and a finger lever controlled operating mechanism by means of which the tool may be guided and operated single handedly.

A further object of the invention is to provide a pair of tongs having a movable jaw powered through a finger operated lever arranged to move in a closely restricted space and deliver a maximum holding force to the jaw.

A still further object of the invention is to provide an improved operating linkage for a tool having one or more movable jaws.

Other objects and advantages will become apparent as the description proceeds and a more comprehensive understanding of the invention will be afforded from the following detailed specification when considered in conjunction with the accompanying drawing, in which Fig. 1 is a side view of a pair of tongs illustrating the invention in a preferred embodiment thereof, Fig. 2 is an end view of these tongs showing their handle construction, Fig. 3 is a bottom view of the jaw portion of the tongs, Fig. 4 is a cross-sectional view of the tongs taken along the line 4—4 of Fig. 1, Fig. 5 is an end view of the tongs looking into the jaw end thereof, Fig. 6 is a side view of a pair of tongs illustrating the invention in a modified form, and Figs. 7 and 8 are perspective views of the jaw operating levers employed respectively in the tongs illustrated in Figs. 1 and 6.

The tongs illustrated in Fig. 1, comprise a long U-shaped shank 11 to which a pistol grip handle 12 is attached as by the two bolts 13 and 14. As a part of the shank 11 a fixed jaw 15 is provided which takes the form of an extension thereof. Cooperating with the fixed jaw 15, is a movable jaw 16 which pivots about a pin 17 on which it is mounted. Two washers 18, spaced on either side of the jaw 16 maintain it centrally on the pin 17, so that its serrated surface 19 may be moved into and against a concave inner surface 21 of the jaw 15 when very small objects are grasped.

For moving the jaw 16, an operating lever 22 (Fig. 7) is provided which is retained within the walls of the shank 11. This lever mounts two fixed pins 23 and 24 between which an arm 25, forming a part of the movable jaw 16, rides. The lever itself is held within the shank 11 by a pin 26, about which it is free to move. Attached to the pin 24 is a link 27 which connects the operating lever with a finger operated lever 28. This latter element is located close to the handle 12 for finger operation. It is supported within the shank 11 on a pin 29 about which it moves and is biased in its foremost position by a spring 31 carried within the shank and anchored thereto by a pin 32. In a sense the spring biases the movable jaw 16 into its open position, since the forward movement of the finger operated lever carries the link 27 in that direction, rocks the operating lever upwardly moving the arm 25 with it, and pivots the jaw 16 downwardly to open position.

The tongs illustrated in Fig. 6 showing the invention in modified form have essentially the same parts as does the pair just described. Thus, this tool has a U-shaped shank 35, one end of which extends to form a fixed jaw 36, and the other end of which has fitted thereto a pistol grip handle 37. Here, also, a spring biased movable jaw 38 is provided which is rocked by an operating lever 39 actuated by a finger operated lever 41 through a rigid link 42.

Aside from minor changes in the shape of the shank and the location of the handle, this modification of the invention presents only two features distinguishing it from the preferred embodiment. These differences reside in its operating lever arrangement and in the placement of the jaw opening spring. Here, it will be noted that a spring 43 fixed at one end to a pin 44 passed through an enlarged section 45 of the shank, is attached directly to the jaw 38. Also, it will be seen that the operating lever 39, which is held within the section 45 of the shank by a pin 46, is so arranged that a pin 47 carried therein is moved against an arm 48 of the jaw 38 to pivot the latter into clamping position. Here, the lever 39 is operated by the link 42 connecting therewith through a pin 48.

Both modifications possess desirable qualities not found in the other and are individually adaptable to their respective applications. These differences will be apparent to those skilled in the art, but it should be pointed out that the arrangement of the parts illustrated in Fig. 1, provides for the housing of all of the working elements within a shank of minimum width.

Although not limited to any one type construction, the handles of the tongs are designed for minimum fatigue and maximum comfort. As will be seen in Fig. 2, the handle 12 comprises a center section, or core 49 which is covered on two of its sides by layers of sponge rubber 51 and 52. The handle 37 is constructed in like manner.

The mode of operation of these tongs is considered to be amply covered in the above description and accordingly will not be elaborated upon. Neither will its uses, which are legion, be catalogued. A full teaching of the invention will be enhanced, however, by a brief treatment of some of the problems solved.

One of the most common problems relates to lavatory and sink drain pipes, which often become clogged with solid waste, plug chains, screws, silverware, etc. Heretofore, the recovery of such objects necessitated the removal of a drain plug, at least, and more frequently the entire disconnection of the trap. With the instant invention, a drain pipe may be thoroughly cleaned, in a matter of a few minutes, by simply removing the screen and withdrawing all foreign matter out of the mouth of the drain. For such purposes a tool having an eighteen inch shank, nine-sixteenths of an inch in width is suitable. Here, the novel operating mechanism of the instant device makes the narrow width possible.

Although the tool may be made with shank lengths of five feet or more for recovering objects from behind heavy structures such as safes, from grate covered area ways, from behind large radiators or from radiator segments, and so forth, a tool suitable for general household use will take a somewhat shorter length. Thus, a tool having a shank of from twelve to twenty-four inches in length will be sufficiently wieldable to perform numerous routine tasks other than that of reaching inaccessible places. The serrated movable jaw operating in conjunction with the concaved fixed jaw makes it possible to grasp round, circular, square or flat objects, whether hard or soft, with equal certainty. Due to the arrangement of the operating lever, the movable jaw may be opened in free space to substantially twice the width of the tool shank and can, therefore, accommodate the tool for handling larger objects. It may be used also in hot or cold liquids or under other circumstances where it would be dangerous or distasteful to use the hands.

While specific embodiments of the invention have been illustrated and described, it is of course possible that the invention may be practiced in other ways without departing from its basic concepts. Insofar as such changes and modifications to which the invention is susceptible fall within the scope of the appended claim, they are intended to be covered as if described.

What is claimed is:

In a pair of long shanked tongs, the combination of a fixed jaw comprising an extension of the tong's shank, a movable jaw mounted to turn on a pivot fixed in said shank, an arm forming an extension on said movable jaw, an operating lever pivoted for movement within said shank, first and second camming pins mounted in said operating lever between which said arm is passed, and means including a link extending along and in said shank connected to said operating lever to pivot the same and urge said camming pins against said arm whereby said movable jaw is moved toward and away from said fixed jaw.

CLIFFORD O. CROW.

REFERENCES CITED

The following references are of record in the file of this patent:

UNITED STATES PATENTS

| Number | Name | Date |
| --- | --- | --- |
| 479,959 | Stanley | Aug. 2, 1892 |
| 663,628 | Hiett | Dec. 11, 1900 |
| 866,994 | Wohlwend | Sept. 24, 1907 |
| 1,049,739 | Leach, Jr. | Jan. 7, 1913 |
| 2,025,254 | Stuart | Dec. 24, 1935 |
| 2,243,305 | Adler | May 27, 1941 |

FOREIGN PATENTS

| Number | Country | Date |
| --- | --- | --- |
| 19,325 | Great Britain | Sept. 7, 1904 |